Nov. 15, 1960  C. M. FINIGAN  2,960,549
POLYMER REMOVAL
Filed April 6, 1959  3 Sheets-Sheet 1

Inventor
Charles Milne Finigan
By Stevens Davis Miller & Mosher
Attorneys

Nov. 15, 1960

C. M. FINIGAN 2,960,549

POLYMER REMOVAL

Filed April 6, 1959

Inventor
Charles Milne Finigan
By Stevens, Davis, Miller & Mosher
Attorneys

Nov. 15, 1960 C. M. FINIGAN 2,960,549
POLYMER REMOVAL
Filed April 6, 1959 3 Sheets-Sheet 3
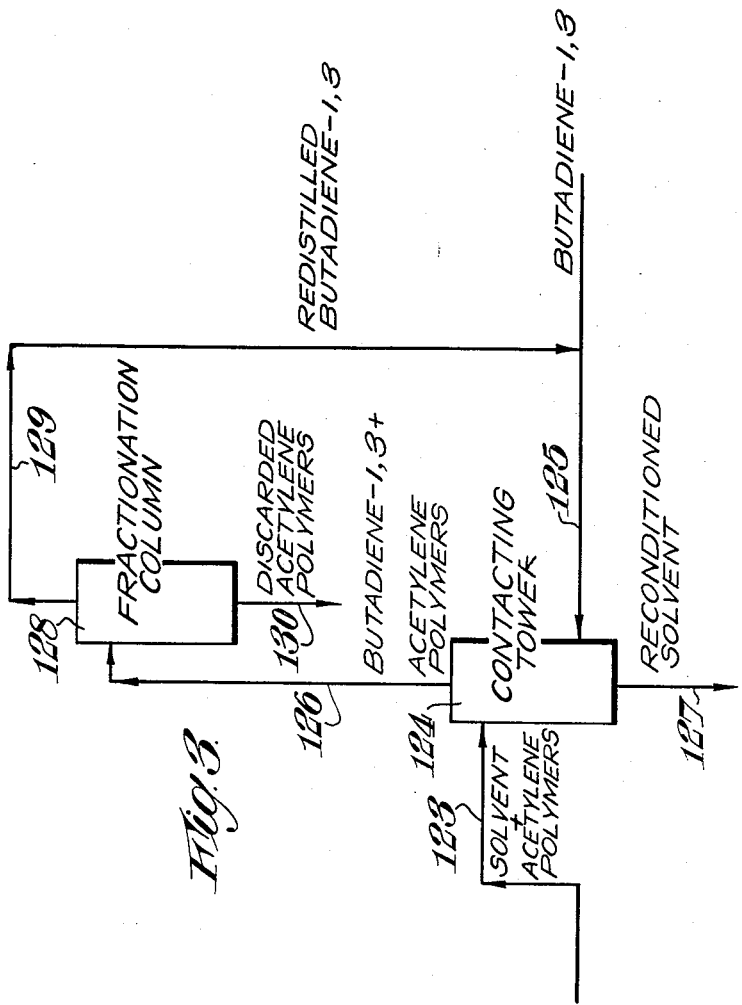
Inventor
Charles Milne Finigan
By Stevens Davis Miller & Mosher
Attorneys United States Patent Office 2,960,549
Patented Nov. 15, 1960

2,960,549

POLYMER REMOVAL

Charles Milne Finigan, Sarnia, Ontario, Canada, assignor to Polymer Corporation Limited, Sarnia, Ontario, Canada, a corporation Filed Apr. 6, 1959, Ser. No. 804,310

Claims priority, application Canada Mar. 21, 1959

14 Claims. (Cl. 260—681.5)

This invention relates to an improved process for the recovery of a desired diolefin from a mixture of said diolefin with other saturated and unsaturated organic compounds.

It is well known that hydrocarbons may be dehydrogenated to form highly desired products. For example, butane may be dehydrogenated to butylenes and butadienes, butylenes may be dehydrogenated to butadiene-1,3, isopentene may be dehydrogenated to isoprene, etc. Such reactions are carried out at elevated temperatures, preferably in the presence of a dehydrogenation catalyst.

Since these dehydrogenation reactions are not 100% selective and since they do not proceed to 100% conversion, the product contains unchanged starting material, desired dehydrogenated product and undesired dehydrogenated by-products among which are acetylenic materials. For example, in the production of butadiene-1,3 by the dehydrogenation of n-butylenes, the product may contain propylene, n-butene-1, cis-butene-2, trans-butene-2, butadiene-1,3, allenes, pentanes and higher homologues, methyl acetylene, vinyl acetylene, ethyl acetylene, dimethyl acetylene, etc. Therefore in order to obtain butadiene in relatively pure form, it is necessary to subject the product to an extraction operation.

The extraction of the desired diolefinic compound from the more saturated compounds is conventionally accomplished in a multistage countercurrent liquid-liquid extraction train. This process comprises a plurality of stages each of which consists of a mixer and a settler. The actual number of stages employed depends on the composition of the hydrocarbon stream which is being purified and on the purity of the product desired. Four such stages may be adequate although it is usual to use from eight to twelve. In the mixers, a preferential solvent for the diolefin is intimately contacted with the hydrocarbon mixture. The mixture so formed is separated in the settlers into a solvent phase containing dissolved diolefin and a hydrocarbon phase. The solvent phase in each case after being separated in the settler is passed into contact with further hydrocarbon having a higher diolefin concentration than the hydrocarbon from which it was separated. The hydrocarbon phase from each settler is contacted with a solvent having a lower diolefin content than the one from which it has been separated. After the solvent phase has passed through the mixer and settler of the last stage, it is heated and passed to a settler to reject, in the liquid phase, substantially all hydrocarbons except the desired diolefin. The rejected hydrocarbons are separated from the solvent phase and are recycled to the solvent phase passing to the mixer and settler of the last stage. The diolefin-rich solvent is then passed to the desorber where the diolefin product is recovered as a gas, washed and liquified. To achieve phase separation required for the efficient operation of the process, adequate provision must be made for the elimination from the system of any materials which tend to cause entrainment.

A suitable solvent for a process such as that outlined above is an ammoniacal cuprous salt solvent with a suitable anion. Examples of such anions include sulfate, phosphate, acetate, lactate, tartrate, borate, carbonate, chloride, fluoride, glycolate, thioglycolate, benzoate, salicylate, etc. For the extraction of butadiene-1,3 from a hydrocarbon stream it is preferred to use as a solvent an aqueous solution containing 2–5 moles of cuprous copper, a trace of cupric copper and greater than 10 moles of ammonia, with the anion being acetate.

It is known that some acetylenes are more soluble in the solvent than the diolefin. For example, it is well known that $C_4$ acetylenes have about forty times greater solubility than butadiene-1,3 in the cuprous ammonium acetate solvent which is used commercially in recovering butadiene-1,3 from hydrocarbon streams. These acetylenes are known to polymerize very readily, particularly at temperatures prevalent in the desorption process and in the presence of cuprous salts. The polymers so formed have a strong emulsifying effect reducing the efficiency of the phase separation.

It has now become common practice to remove the acetylenes in an acetylene removal unit by a pretreatment of the hydrocarbon stream with a small amount of the preferential solvent so that the solvent dissolves essentially all of the acetylenes and a small but significant proportion of the desired conjugated diolefin. Such a procedure is described in United States Patent 2,788,378 issued to Cotton et al. on April 9, 1957. In this process it is normal practice to recover both the conjugated diolefin and the solvent. This is usually accomplished by conventional stripping steps to flash off the dissolved diolefins and acetylenes in successive zones. The stripped solvent is then used in further extractions either in the acetylene removal or butadiene-1,3 extraction operations. During the stripping process sufficient of the acetylenes polymerize, or remain dissolved in the solvent to polymerize, eventually, that the accumulation of such polymers would promote foaming and emulsification in the extraction system. Accordingly, it is preferred practice to treat the solvent for removal of polymeric materials before it is returned to the main body of solvent. Solid adsorptive materials such as activated charcoal have been used in an effort to control the accumulation of polymeric materials in the solvent.

However, the effectiveness of the solid adsorbents in removing the polymers is limited and after a period of time, usually of the order of only a few days, the solid adsorbent becomes spent and even less effective due to saturation of its surface with the adsorbed polymeric substances. Thus, the limited efficiency of polymer removal by solid adsorbent becomes further limited with time and increasing quantities of polymers pass completely through the bed of adsorbent and remain in the solvent to reduce the efficiency of the process. Finally the adsorbent must either be regenerated or replaced. Neither alternative is at all satisfactory.

It is an object of the present invention to disclose an improved process of removing the polymeric impurities from the solvent.

It is a further object of this invention to disclose an improved process in which there is no need for a contact material which must be periodically replaced or reconditioned.

The objects of the invention are achieved by the process which comprises contacting a solvent selective for conjugated diolefins and acetylenes, said solvent containing polymeric substances comprising acetylenes dissolved therein, with a conjugated diolefin, whereby to extract preferentially said polymeric substances, the extraction operation being carried out at a temperature above about 25° C. and the weight ratio of said solvent to said conjugated diolefin being between about 10:1 and 1:1.

In the preferred embodiment of the invention the process involves contacting a mixture of $C_4$ hydrocarbons containing butadiene-1,3 and acetylenic hydrocarbons with aqueous cuprous ammonium acetate, the weight ratio of the solvent to the hydrocarbon mixture being between 1:10 and 1:1, whereby to dissolve said acetylenic hydrocarbons, passing said solvent containing dissolved hydrocarbons to conventional stripping zones wherein a portion of the dissolved hydrocarbons is stripped out but at least a portion of the dissolved acetylenic hydrocarbons is converted to polymeric substances, contacting the solvent containing said polymeric substances with liquid butadiene-1,3 at a temperature in the range of 25° C. to 65° C. whereby to preferentially extract said polymeric substances, and separating said liquid butadiene-1,3 having polymeric substances dissolved therein from reconditioned solvent, whereby said reconditioned solvent may be reused, the weight ratio of solvent to butadiene-1,3 in the polymer extraction operation being between 10:1 and 1:1.

In drawings which represent idealized flow diagrams of the process of the present invention, Fig. 1 represents the invention in one of its broader forms;

Fig. 3 represents a modification of the preferred form of the invention shown in Fig. 2.

Figure 1:
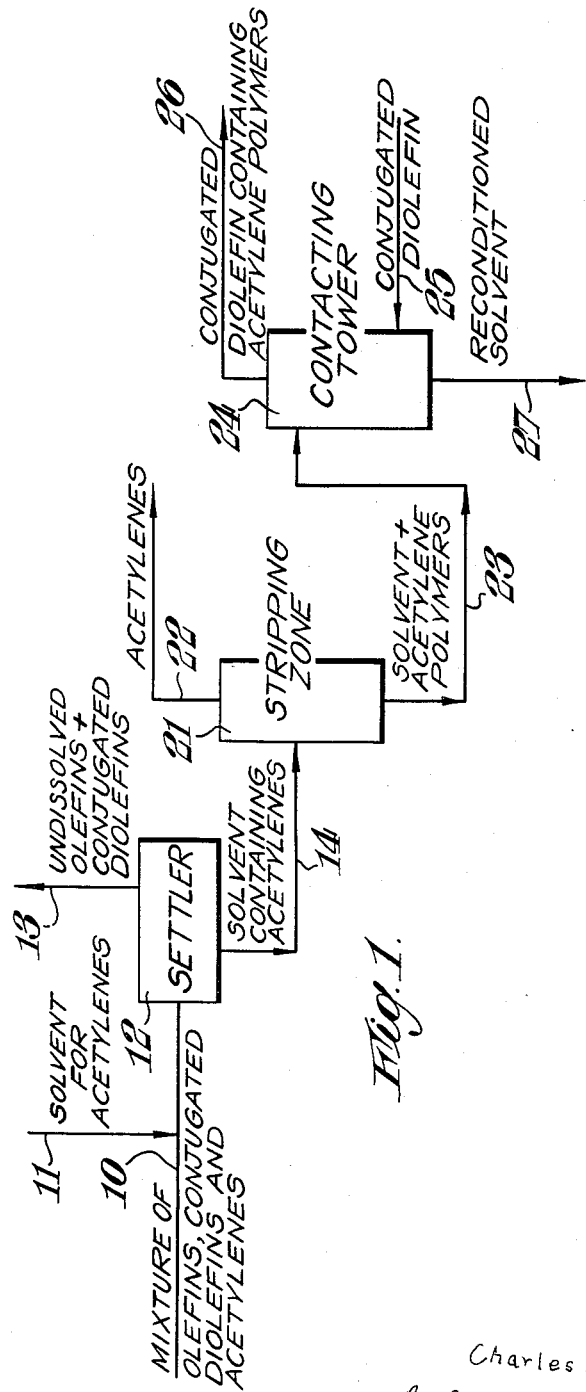

Turning firstly to Fig. 1, it is seen that the mixture of olefins, conjugated diolefins and acetylenes flowing through line 10 is mixed, in such line, with a solvent for such diolefins and acetylenes flowing through line 11. The mixture then passes to a settler 12 where two phases are formed. The upper phase consists of the olefins and conjugated diolefins and it is drawn off through outlet line 13 and led to the conventional countercurrent extraction system (not shown) where the conjugated diolefin is separated from the other hydrocarbons. The lower phase consists of the solvent containing the dissolved acetylenes, as well as any of the conjugated diolefins which may be dissolved therein. This phase is withdrawn through outlet line 14.

The material passing through outlet line 14 enters a stripping zone 21. In the stripping operation some of the acetylenic hydrocarbons are converted to polymeric substances. A portion of the acetylenic hydrocarbons is flashed off, together with any conjugated diolefins which may have been dissolved in the solvent. Such hydrocarbons are removed through outlet line 22.

The solvent containing the polymeric substances is withdrawn through outlet line 23 and passed to contacting tower 24. Here it is countercurrently contacted with a conjugated diolefin-rich hydrocarbon stream entering through inlet line 25. The conjugated diolefin is preferably the same as the one entering the system at inlet line 10.

The conjugated diolefin dissolves the polymeric substances derived from the acetylenic hydrocarbons and passes out of the contacting tower through outlet line 26. The reconditioned solvent which is now substantially free of the polymeric substances derived from the acetylenic hydrocarbons is withdrawn from the contacting tower through outlet line 27 and may be used in the main extraction units, although such step is not shown.

Figure 2:
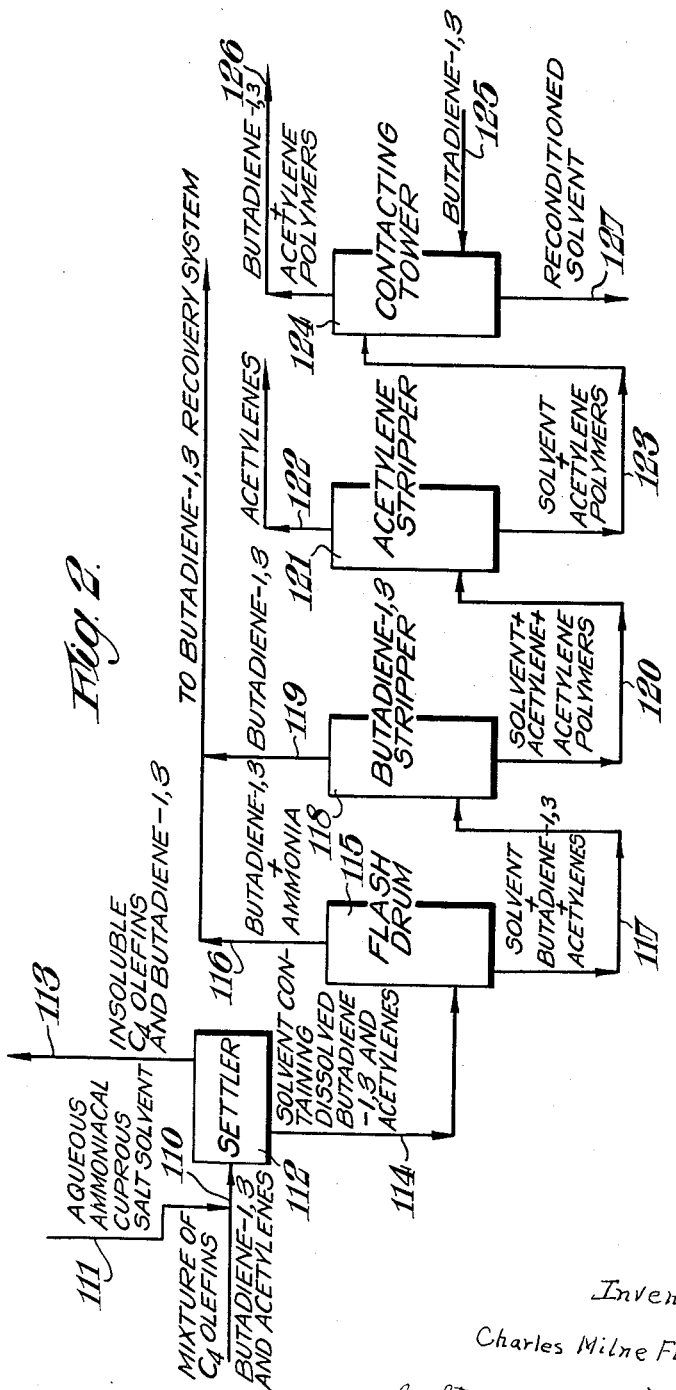
Fig. 2 represents one preferred form of the invention.

In the embodiment shown in Fig. 2, the mixture comprising $C_4$ olefins, butadiene-1,3 and acetylenes, entering through line 110 is mixed with the solvent, an aqueous ammoniacal solution of a cuprous salt, entering through line 111. It is preferred that the amount of solvent preferentially dissolve the acetylenes, although a small but significant amount of butadiene-1,3 is usually also dissolved. The ratio of solvent to hydrocarbon stream for this purpose can be varied from about 1:10 to 1:1 and it is preferred to use a ratio of about 1:5. The temperature required for adequate absorption is usually in the range from —20° C. to 0° C. with a temperature of about —10° C. being preferred. The mixed hydrocarbon and solvent enter settler 112 where two phases, hydrocarbon and solvent, are formed. The hydrocarbon phase consists of those hydrocarbons which did not dissolve in the solvent, namely the $C_4$ olefins and the major part of the butadiene-1,3. It is withdrawn through outlet 113 and passes to the conventional countercurrent extraction system (not shown) where the butadiene-1,3 is separated from other hydrocarbons.

The solvent phase consists of the solvent containing substantially all the acetylenes as well as a small but significant amount of butadiene-1,3. It is withdrawn through outlet line 114 and enters flash drum 115 where the temperature of the solvent is increased to about 40° to 60° C. flashing off a large portion of the butadiene-1,3 and some ammonia vapour. These are led through outlet line 116 to a butadiene-1,3 recovery system (not shown).

The solvent, now containing the acetylenes and some of its originally dissolved butadiene-1,3 passes through line 117 to butadiene stripper 118 where the temperature of the solvent is further increased to 65° to 75° C. to desorb the remainder of the butadiene-1,3. The desorbed butadiene-1,3 leaves the stripper through outlet line 119 and merges with the butadiene-1,3 and ammonia in line 116, and thus is subsequently recovered. Since acetylenes, particularly vinyl acetylenes, polymerize readily, a portion of those present in the solvent is converted to polymeric materials in stripper 118 during the heating step.

The solvent, which now contains the acetylenes as well as the polymeric materials derived from such acetylenes, now passes through line 120 to acetylene stripper 121 where the temperature of the solvent is further increased, this time to 80 to 90° C. At such temperature appreciable quantities of acetylenes are desorbed and removed from the system through line 122. However, some of the acetylenes and the polymers derived therefrom remain in the solvent.

This solvent, which now contains the polymeric materials derived from the acetylenes, passes through line 123 to contacting tower 124. Here it passes countercurrently to butadiene-1,3 which enters through line 125. The temperature of contact tower 124 should be between 25° C. and 80° C. with a temperature of about 30–50° C. being preferred. The butadiene-1,3 dissolves the polymeric substances and leaves the contact tower through line 126. The reconditioned solvent is withdrawn through line 127 for further use.

In the modification and extension shown by Fig. 3, the butadiene-1,3 having the polymeric substances derived from the acetylenes is passed through line 126 to a fractionating column 128. Here a fractional distillation occurs and the volatile overhead butadiene-1,3 is removed through line 129 to merge with the butadiene-1,3 in line 125 and re-enter contacting tower 124. The bottoms cut comprising polymeric substances is withdrawn through line 130.

While the figures illustrate the use of the present invention for the removal of acetylenic polymers from an ammoniacal cuprous salt solvent in which the appreciable quantities of polymers are formed during the stripping steps, the invention applies to the removal of acetylenic polymers from such solvents regardless of how they are formed. For example, in the conventional process of separating butadiene-1,3 from $C_4$ hydrocarbon streams using an ammoniacal cuprous salt solvent in a series of mixer-settler units, it is known that acetylenes present polymerize in the presence of the solvent even at low temperatures. Some of the polymers so formed tend to concentrate at the interface in the settlers. These may be removed by withdrawing a portion of the interface from the settler and washing such portion with a butadiene-1,3- rich hydrocarbon stream in accordance with the present invention.

Test series No. 1

A series of tests were conducted in order to ascertain the effect of temperature on the solubility of the polymeric substances in butadiene-1,3. The tests also were carried out to determine the effect of different ratios of cuprous ammonium acetate solvent to butadiene-1,3. All experiments were carried out in 30 fl. oz. bottles capable of withstanding in excess of 100 lbs. pressure and capped with butyl rubber self-sealing gaskets and a pierced crown top.

Each bottle was purged with nitrogen and a measured amount (300 gms. in all cases) of a copper solvent containing acetylenic polymers was introduced, and chilled to below −18° C. The desired amount (e.g. 75 gms. for 4/1 weight ratio) of liquid butadiene-rich $C_4$ hydrocarbons (85.9 mol percent butadiene-1,3) was then added. The bottles were capped and placed in ovens at various temperatures. Agitation was achieved by means of rollers and continued for one hour to ensure that equilibrium conditions had been reached.

Immediately upon removal of the bottle from the ovens the solvent phase was drawn off through a hypodermic needle.

The amount of polymer extracted by the liquid hydrocarbons remaining in the bottle was then determined.

Experiments were performed at various temperatures and weight ratios of solvent to hydrocarbon.

The copper solvent used contained 0.25 mole/liter of cupric copper, 3.25 moles/liter of cuprous copper, 9.9 moles/liter of ammonia and 4.5 moles/liter of acetate ions. The results are shown in Table I.

TABLE I

*Effect of temperature and solvent:hydrocarbon ratio using hydrocarbon containing 85.9% butadiene-1,3*

| Temperature ° C. | Wt. Ratio Solvent:Hydrocarbon | Wt. Polymeric Substances Extracted per 100 Grams Hydrocarbon, in Grams |
|---|---|---|
| 26 | 5:1 | 0.31 |
|    | 4:1 | 0.31 |
|    | 3:1 | 0.26 |
|    | 2:1 | 0.20 |
| 32 | 5:1 | 0.50 |
|    | 4:1 | 0.48 |
|    | 3:1 | 0.45 |
|    | 2:1 | 0.31 |
| 38 | 5:1 | 0.60 |
|    | 4:1 | 0.63 |
|    | 3:1 | 0.49 |
|    | 2:1 | 0.35 |

The data shown in Table I reveal that the efficiency of the extraction is dependent both on the temperature at which it takes place and upon the ratio of hydrocarbon to solvent used.

Test series No. 2

A further series of tests were carried out, in the same manner as shown on Test Series No. 1, but in order to determine the effect on the extraction efficiency of different concentrations of the conjugated diolefin, in this particular case, of butadiene-1,3 in the hydrocarbon extractant. The tests were carried out at a temperature of 38° C. using a solvent:hydrocarbon ratio of 4:1. The results are shown in Table II.

TABLE II

*Effect of butadiene-1,3 concentration in the extractant*

| Mol percent Butadiene-1,3 in Hydrocarbon | Wt. Polymer Extracted per 100 Grams of Copper Solvent in Grams | Wt. percent Polymer in Hydrocarbon after Extraction |
|---|---|---|
| 0.25 (1) | 0.14 | 0.56 |
| 25.5 (2) | 0.15 | 0.61 |
| 45.0 (3) | 0.15 | 0.61 |
| 72.0 (4) | 0.18 | 0.73 |
| 85.9 (5) | 0.19 | 0.74 |
| 97.3 (6) | 0.21 | 0.84 |

(1) Butadiene-1,3: 0.25%. n-Butylenes: 52%. Isobutylene: 12.75%. Butanes: 35%.
(2) Butadiene-1,3: 25.5%. n-Butylene: 46.5%. Isobutylene: 9%. Butanes: 19%.
(6) Butadiene-1,3: 97.3%. n-Butylene: 2.7%.
(3), (4) and (5) are mixtures of (1) and (6) to achieve concentrations as indicated.

These results may be plotted graphically to show that the amount of polymer extracted by the hydrocarbon increases gradually until the butadiene-1,3 concentration reaches the range of 60–70 mol percent. For concentrations greater than about 60 mol percent the amount of polymer extracted increases sharply with the concentration. From these data it can be seen that, although the present invention is operative for different concentrations of conjugated diolefin in the hydrocarbon extractant, optimum results are achieved if the mol percent of conjugated diolefin in the hydrocarbon extractant is greater than about 60.

These data show that $C_4$ hydrocarbons other than butadiene-1,3 are less efficient extractants for the polymers than is butadiene-1,3. Specifically, it should be noted that the hydrocarbon with the highest proportion of butylenes extracts only ⅔ the weight of polymers extracted by the relatively pure butadiene-1,3.

Test series No. 3

The ultimate test of any treatment for the removal of emulsion increasing contaminants is the reduction in the emulsion tendency of the solvent. It is therefore standard practice to evaluate the condition of a solvent by determining the time required for an emulsion of the solvent and hydrocarbon to break. The condition of the solvent may therefore be expressed in terms of its "emulsion time."

A sample of solvent known to contain polymers of acetylene origin was divided in 3 parts. Sample (*a*) was not treated. Sample (*b*) was treated by passing through fresh activated charcoal (solvent to charcoal ratio 300:1) and Sample (*c*) by butadiene-1,3 extraction at 38° C. (solvent to butadiene-1,3 ratio 4:1). The emulsion time of the samples was then determined. The charcoal treatment had reduced the emulsion time of Sample (*b*) to 73% of Sample (*a*) and the process of this invention had reduced the emulsion time of Sample (*c*) to 50% of Sample (*a*).

EXAMPLE 1

A pilot plant scale extraction process was carried out using an Oldshue column as the contacting tower between the aqueous ammoniacal solution of cuprous acetate and the hydrocarbon mixture containing 85.9 mol percent butadiene-1,3. Solvent from a conventional extraction unit having a composition as shown in Test Series No. 1 and containing acetylenic polymers was passed to the top of the Oldshue column while the butadiene-1,3 containing hydrocarbon passed to the bottom of the Oldshue column. A total throughput of 400 U.S. gallons/hour/square foot was maintained at a solvent to hydrocarbon weight ratio of 4:1. The rotor speed of the Oldshue column was varied from 0 to 175 r.p.m. to determine the effect of mixing on the extraction. The operating conditions are summarized in Table III.

TABLE III

| Run No. | Solvent Feed Rate, lb./hrs. | Solvent Feed Temp., °C. | Solvent Outlet Temp., °C. | Hydrocarbon Feed Rate, lb./hrs. | Hydrocarbon Feed Temp., °C. | Column Pressure, p.s.i.g. | Column Rotor Speed (r.p.m.) | Mixture Throughput U.S.G./hr./ft.² | Solvent/Hydrocarbon Weight Ratio |
|---|---|---|---|---|---|---|---|---|---|
| 1 | 550 | 36 | 28 | 131 | 14 | 45 | 0 | 404 | 4.2 |
| 2 | 545 | 35 | 24.5 | 133 | 14 | 42 | 75 | 404 | 4.1 |
| 3 | 533 | 35.5 | 26 | 133 | 14 | 44 | 125 | 398 | 4.0 |
| 4 | 545 | 39.5 | 29 | 132 | 13.5 | 46 | 0 | 403 | 4.1 |
| 5 | 550 | 39.5 | 30 | 133 | 20 | 48 | 175 | 406 | 4.1 |

While the data is limited to 38° C. the practice of the invention at higher temperatures is practical but will require equipment capable of withstanding the pressures necessary to maintain the butadiene-1,3 extractant liquid at those temperatures. Moreover, at excessive temperatures and pressures polymerization of butadiene-1,3 to dimers and higher polymers would be expected. Temperatures as high as 80° C. however appear to be entirely practical.

Samples of the hydrocarbon and solvent leaving the column were taken during each of runs 1, 2, 3, 4 and 5. The hydrocarbon phase was analyzed for butadiene-1,3 and polymer content. The solvent phase was heated to desorb dissolved hydrocarbons which were analyzed by infra-red for butadiene-1,3. The results of these analyses are shown in Table IV.

TABLE IV

| | Analysis of Hydrocarbon | | Analysis of Solvent | |
|---|---|---|---|---|
| Run No. | Polymer in Hydrocarbon Phase, wt. percent | Butadiene,1-3 in Hydrocarbon Phase, Mol percent | Hydrocarbon in Solvent Phase, wt. percent | Butadiene-1,3 in Desorbed Hydrocarbon, Mol percent |
| 1 | 0.084 | 85.0 | 0.82 | sample lost. |
| 2 | 0.12 | 84.2 | 1.34 | 95.1. |
| 3 | 0.18 | 83.5 | 1.87 | 92.5. |
| 4 | 0.086 | 84.8 | 0.96 | 91.7. |
| 5 | 0.27 | 86.1 | 1.85 | 95.6. |

These data show that under actual pilot plant operation, the process of the present invention effectively extracts the polymeric substances from the aqueous ammoniacal cuprous acetate solvent. They also show that only a negligible amount of butadiene-1,3 is dissolved in the solvent during the extraction operation.

Regarding the operable ratios of solvent to hydrocarbon, there are no theoretical maximum or minimum limits beyond the fact that sufficient of the butadiene-1,3-rich hydrocarbon mixture must be used to extract the polymer from the solvent and for economic reasons it is undesirable to use excessive quantities of the hydrocarbon mixture. Thus it is desirable to practice the present invention by the use of solvent to hydrocarbon ratios between 10:1 and 1:1. It is preferred to use ratios in the range of 7:1 to 3:1.

It is to be observed that while the examples herein show the process of the present invention in which the conjugated diolefin is butadiene-1,3, the invention is equally useful when other conjugated diolefins having 4 carbon atoms in the unsaturated chain, such as for example isoprene, or dimethyl butadiene, are used.

What I claim is:

1. In a process for the separation of a conjugated diolefin having 4 carbon atoms in the unsaturated carbon chain from a hydrocarbon mixture containing other hydrocarbons including acetylenes which comprises contacting said mixture in an absorption stage with a cuprous ammoniacal salt solvent whereby the conjugated diolefin and acetylenes are absorbed by the solvent, passing the solvent containing absorbed hydrocarbons to a desorption zone where the conjugated diolefin and some acetylenes are stripped from the solvent and returning the stripped solvent, containing acetylenic polymers formed during the absorption and desorption stages to the absorption stage, the improvement which comprises contacting the stripped solvent containing acetylene polymers with a liquid hydrocarbon comprising at least 60 mol percent conjugated diolefin having 4 carbon atoms in the unsaturated carbon chain whereby to extract said acetylenic polymers before the stripped solvent is returned to the absorption stage, the extraction operation being carried out at a temperature above 25° C. and the weight ratio of said stripped solvent to said liquid hydrocarbon being between about 10:1 and 1:1.

2. The process according to claim 1 in which the conjugated diolefin is butadiene-1,3.

3. The process according to claim 2 in which the extraction process is carried out at a temperature of 30–50° C.

4. The process according to claim 1 in which the conjugated diolefin is butadiene-1,3, and the extraction process is carried out at a temperature between 30–50° C. and the ratio of butadiene-1,3 to solvent is between 7:1 and 3:1.

5. In a process for the separation of butadiene 1,3 from a hydrocarbon mixture containing other hydrocarbons including acetylenes which comprises contacting said mixture in an absorption stage with a cuprous ammonium acetate solvent whereby the butadiene-1,3 and acetylenes are absorbed by the solvent, passing the solvent containing absorbed hydrocarbons to a desorption zone where the butadiene-1,3 and some acetylenes are stripped from the solvent and returning the stripped solvent, containing acetylenic polymers formed during the absorption and desorption stages to the absorption stage, the improvement which comprises contacting the stripped solvent containing acetylene polymers with a liquid hydrocarbon containing at least 60 mol percent butadiene-1,3 whereby to extract said acetylenic polymers before the stripped solvent is returned to the absorption stage, the extraction operation being carried out at a temperature above 25° C. and the weight ratio of said stripped solvent to said liquid hydrocarbon being between about 10:1 and 1:1.

6. A process as in claim 5 in which the extraction process is carried out at 30–50° C.

7. The process according to claim 6 in which the ratio of solvent to butadiene is between 7:1 and 3:1.

8. In a process for the separation of a conjugated diolefin having 4 carbon atoms in the unsaturated carbon chain from a hydrocarbon mixture including acetylene which comprises contacting the said mixture in an absorption stage with a cuprous ammonium acetate solvent selective for the absorption of conjugated diolefins and acetylenes whereby to dissolve preferentially said acetylenic hydrocarbons therein; passing the solvent containing dissolved acetylenes and incidentally dissolved conjugated diolefin to at least one stripping zone wherein the conjugated diolefin and some acetylenes are stripped from the solvent and the stripped solvent containing acetylenic polymers is recycled to the absorption stage, the improvement which comprises contacting the stripped solvent containing acetylenic polymers with a liquid hydrocarbon comprising at least 60 mol percent conjugated diolefin having 4 carbon atoms in the unsaturated carbon chain whereby to extract said acetylenic polymers before the solvent is returned to the absorption stage, the extraction operation being carried out at a temperature above 25° C. and the weight ratio of said stripped solvent to liquid hydrocarbon being between 10:1 and 1:1.

9. The process according to claim 8 in which the hydrocarbon mixture comprises predominantly $C_4$ hydrocarbons and the conjugated diolefin is butadiene-1,3.

10. The process according to claim 8 in which the extraction operation is carried out at a temperature between 30° C. and 50° C.

11. The process according to claim 8 in which the weight ratio of stripped solvent to liquid hydrocarbon used in the extraction operation is between 7:1 and 3:1.

12. The process which comprises contacting a mixture of $C_4$ hydrocarbons containing butadiene-1,3 and acetylenic hydrocarbons with aqueous cuprous ammonium acetate solvent, the weight ratio of the solvent to the hydrocarbon mixture being between 1:10 and 1:1, whereby to dissolve preferentially said acetylenic hydrocarbons; passing said solvent containing the dissolved acetylenic hydrocarbons to at least one stripping zone wherein incidentally dissolved butadiene-1,3 and some acetylenes are stripped from the solvent and at least a portion of the dissolved acetylenic hydrocarbons is converted to polymeric substances and remain in the stripped solvent; contacting the stripped solvent containing said polymeric substances with a liquefied light hydrocarbon comprising at least 60 mol percent butadiene-1,3 at a temperature in the range of 25° to 65° C. whereby to extract preferentially said polymeric substances, and separating said liquid butadiene-1,3 having polymeric substances dissolved therein from reconditioned solvent, whereby said reconditioned solvent may be reused; wherein the weight ratio of solvent to butadiene-1,3 in the extraction operation is between 10:1 and 1:1.

13. The process according to claim 12 in which the extraction of said polymeric substances is carried out at a temperature between 30° C. and 50° C.

14. The process according to claim 12 in which the ratio of solvent to butadiene-1,3 in the extraction of said polymeric substances is between 7:1 and 3:1.

References Cited in the file of this patent

UNITED STATES PATENTS

| | | |
|---|---|---|
| 2,390,764 | Wolff | Dec. 11, 1945 |
| 2,472,487 | Lovell | June 7, 1949 |